United States Patent [19]

Bertiger et al.

[11] Patent Number: 5,285,208

[45] Date of Patent: Feb. 8, 1994

[54] POWER MANAGEMENT SYSTEM FOR A WORLDWIDE MULTIPLE SATELLITE COMMUNICATIONS SYSTEM

[75] Inventors: Bary R. Bertiger, Scottsdale; Raymond J. Leopold, Chandler; Kenneth M. Peterson, Phoenix, all of Ariz.

[73] Assignee: Motorola, Inc., Schaumburg, Ill.

[21] Appl. No.: 915,393

[22] Filed: Aug. 18, 1992

Related U.S. Application Data

[63] Continuation of Ser. No. 770,754, Oct. 4, 1991, abandoned, Continuation-in-part of Ser. No. 607,218, Nov. 2, 1990, abandoned, Continuation-in-part of Ser. No. 402,743, Sep. 5, 1989, abandoned.

[51] Int. Cl.⁵ ............................................. H04B 7/185
[52] U.S. Cl. .................................... 342/352; 455/13.4
[58] Field of Search ............... 342/352, 358, 354, 355, 342/356; 455/12.1, 13.1, 13.3, 13.4, 98

[56] References Cited

U.S. PATENT DOCUMENTS

| | | |
|---|---|---|
| 3,028,488 | 4/1962 | Hudspeth et al. ............... 455/12 |
| 3,095,538 | 6/1963 | Silberstein ...................... 455/12 |
| 3,928,804 | 12/1975 | Schmidt et al. . |
| 4,090,199 | 5/1978 | Archer . |
| 4,187,506 | 2/1980 | Dickinson . |
| 4,380,089 | 4/1983 | Weir ................................ 455/127 |
| 4,599,619 | 7/1986 | Keigler et al. .................. 342/352 |
| 4,612,546 | 9/1986 | Rosen . |
| 4,630,058 | 12/1986 | Brown ............................. 342/352 |
| 4,870,698 | 9/1989 | Katsuyama et al. ............ 455/127 |
| 4,931,802 | 6/1990 | Assal et al. ..................... 342/356 |
| 5,025,485 | 6/1991 | Csongor et al. ................ 455/13.3 |

Primary Examiner—Theodore M. Blum
Attorney, Agent, or Firm—Frank J. Bogacz; Jordan C. Powell

[57] ABSTRACT

A power management system for a worldwide multiple satellite system having satellites positioned latitudinally in a polar orbiting constellation, each satellite having a plurality of antenna beams, each beam having a given area of coverage or "cell," the total sum of the cells for each satellite forming a larger coverage for the entire satellite, the satellites each comprising solar cells and batteries wherein the energy within the batteries is generated by the solar cells and must be efficiently managed. The system comprises an earth based control station which programs each of the satellites within the constellation to supply power to the antenna beams of each satellite at predetermined times to avoid overlapping coverage. Each satellite comprises a voltage regulated linear power amplifier to supply only the power needed for the demand within each of the antenna's cells.

12 Claims, 2 Drawing Sheets

POWER MANAGEMENT SYSTEM FOR A WORLDWIDE MULTIPLE SATELLITE COMMUNICATIONS SYSTEM

This application is a continuation of prior application Ser. No. 770,754, filed Oct. 4, 1991 now abandoned. Which application is a continuation-in-part of prior application Ser. No. 607,218, filed Nov. 2, 1990, now abandoned. Which application is a continuation-in-part of prior application Ser. No. 402,743, filed Sep. 5, 1989, now abandoned.

CROSS REFERENCE TO RELATED APPLICATIONS

The present application is related to co-pending U.S. patent applications Ser. Nos. 263,849, and 415,814; 415,842; 415,815; and 414,494.

BACKGROUND OF THE INVENTION

This invention relates, in general, to power management, and more specifically, to power management for multiple satellite systems.

Satellites are becoming important links for communication between stations at different locations throughout the world, particularly for mobile communication stations. For a satellite system to give worldwide coverage, a network or constellation of satellites having polar orbits is desirable. Such a satellite system requires low orbits to allow connection with low power mobile stations.

Each satellite within such a satellite constellation is comprised of many directional antenna cells. Combined, these cells create an umbrella of coverage by the satellite. As the satellites in the constellation orbit within the constellation toward the poles, the umbrella of coverage of the satellites begin to overlap. The closer to the poles the satellites get, the greater the overlap. Cells from one satellite will overlap cells from another satellite resulting in redundancy of coverage. When such an overlap occurs, cells from a satellite having an area of coverage directly beneath the satellite are easier to operate than cells covering the same area from a satellite at a distant angle from the coverage area.

As the satellites within the constellation orbit the earth, they are frequently shadowed from the sun by the earth. Since the power to operate the satellites is generated by solar panels, storage cells, or batteries, are required to store energy for use during "dark" periods or high power demands. In a worst case scenario, any given satellite within the constellation would be shadowed by the earth for approximately 35% of the satellite's orbit. At best, each satellite will be in full view of the sun throughout the satellite's orbit 30% of the time. Each satellite evolves through an annual cycle having a fairly equal distribution of best/worst cases.

In order to efficiently utilize the power of the overlapping satellites allowing storage for "dark" periods as well as for high power demand periods, a power management system is required.

SUMMARY OF THE INVENTION

Accordingly, it is an object of the present invention to provide a power management system for efficient use of stored satellite power in a satellite constellation system.

The above objects are realized by a power management system for a worldwide multiple satellite system having satellites positioned latitudinally in a polar orbiting constellation, each satellite having a plurality of antenna beams, each beam having a given area of coverage or "cell," the total sum of the cells for each satellite forming a larger coverage for the entire satellite, the satellites each comprising solar cells and batteries wherein the energy within the batteries is generated by the solar cells and must be efficiently managed. The system comprises an earth based control station which programs each of the satellites within the constellation to supply power to the antenna beams of each satellite at predetermined times. This avoids overlapping coverage. Each satellite comprises a voltage regulated linear power amplifier to supply only the power needed for the demand within each of the antenna's cells.

The above and other objects, features, and advantages of the present invention will be better understood from the following detailed description taken in conjunction with the accompanying drawings.

DETAILED DESCRIPTION OF THE INVENTION

Figure 1:
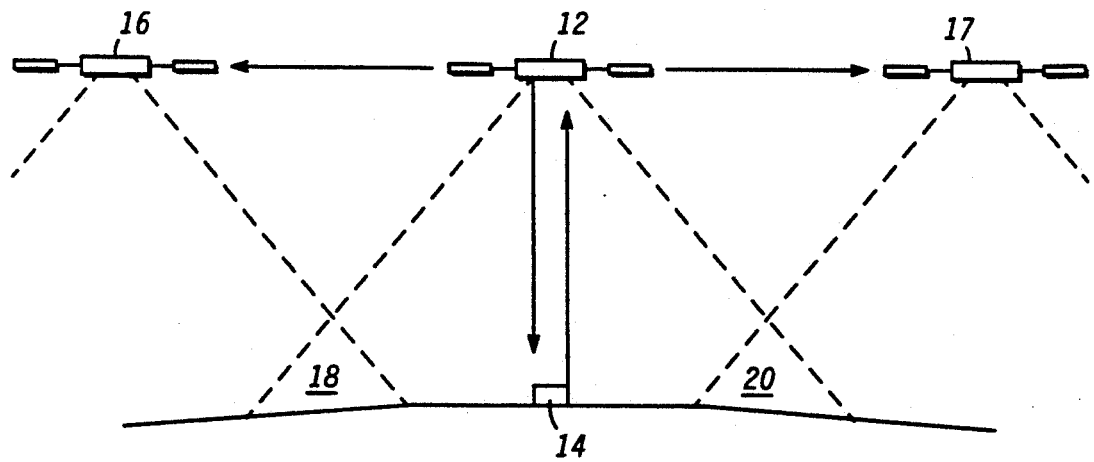
FIG. 1 is a diagram of a portion of a low-altitude orbit satellite constellation system.

A portion of a low-orbit satellite constellation system 10 is shown in FIG. 1. Such a low-orbit satellite system is described in co-pending U.S. patent application Ser. No. 263,849, which is hereby incorporated by reference. The view of FIG. 1 is taken along the flight path of satellite 12 as satellite 12 passes over base control station 14. Satellite 12 and adjacent satellites 16 and 17, as well as all other satellites in the constellation, have a substantially polar-to-polar orbit. As the satellites orbit the earth latitudinally, the earth is spinning longitudinally beneath the constellation. Because of the two different rotating trajectories, each satellite in the constellation, at some given time throughout the entire constellation system rotational period, will be overhead the base control station 14.

As satellite 12, for example, passes over base control station 14, satellite 12 transmits information down to base control station 14 relating to the health and status of the satellites power system, circuits, and orbit. Base control station 14 transmits a signal to satellite 12 which programs satellite 12 to operate in a designated manner over a time interval of typically one to two week periods of time. Base control station 14 can also send a signal to satellite 12 which is then relayed to other satellites throughout the constellation, such as satellites 16 and 17 in FIG. 1, when an abnormally large need for satellite communication is required in an otherwise low use area, or when an emergency arises. Such a signal will over-ride programming previously received from base control station 14 by the receiving satellite. Although the above description referenced satellite 12, similar operations apply to all the satellites within the constellation.

Figure 2:
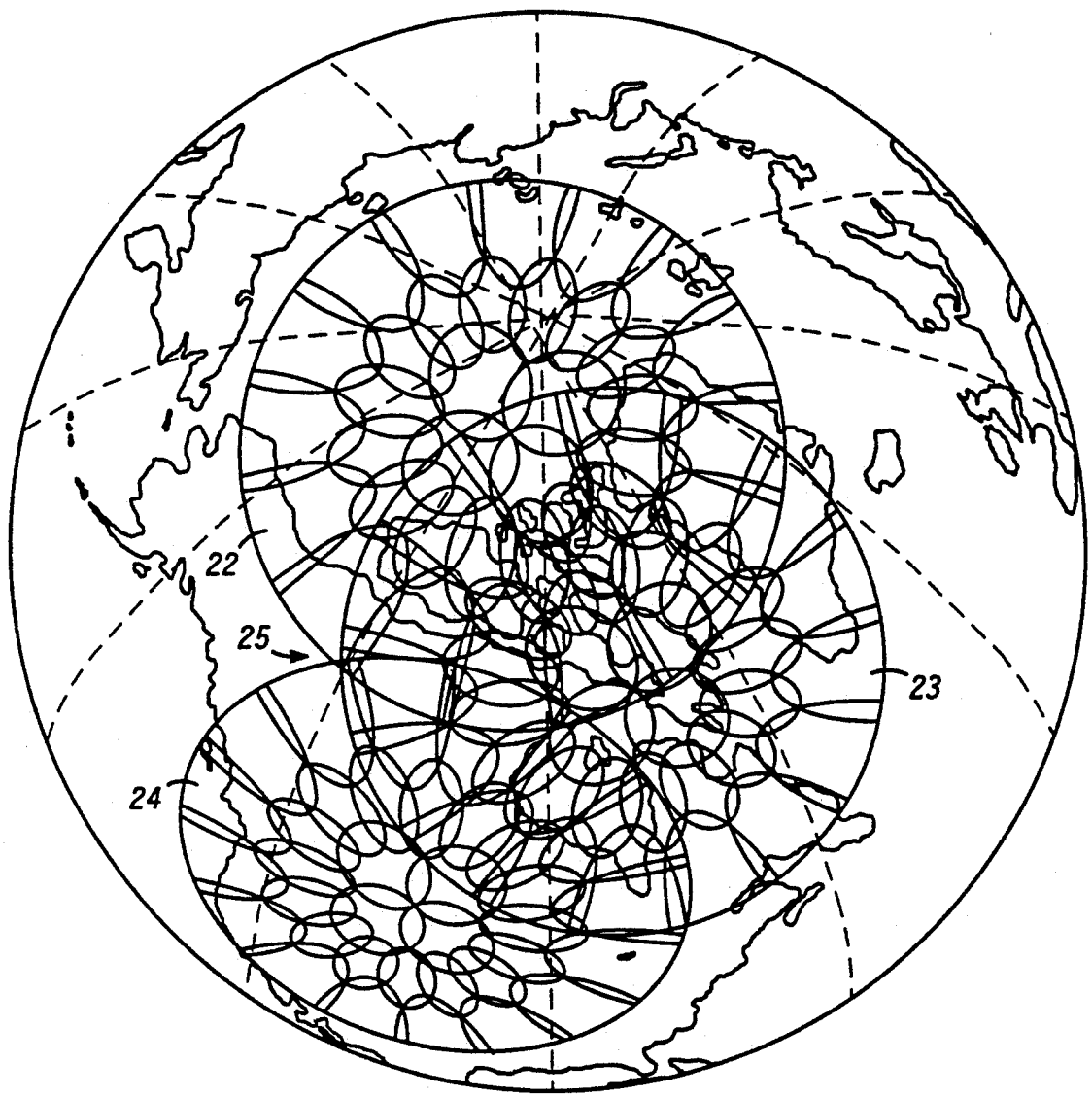
FIG. 2 is a diagram of the coverage for three satellites in a satellite constellation system showing coverage overlap over the earth's northern regions.

Satellite constellation system 10 has several sets of satellites spaced latitudinally around the earth. Due to the polar orbit of the satellites, as each satellite approaches the respective pole, its area of coverage overlaps the coverage area of other satellites approaching the pole. FIG. 2 shows the overlap of three different satellites as they approach the north pole over Canada. The areas of coverage 22, 23, and 24 of three different satellites are shown with their individual cells. As seen, heavy overlap exists in overlap area 25. Specific cells, or coverage areas for individual antenna beams, overlap in certain areas. Since only one cell is needed to cover a given area, the present invention allows two of the three overlapping cells to be turned off. The power to the cell's antenna beam is shut off to save power within the satellite.

The significance of the power savings is appreciated when considering the source of power for the satellite and the satellite's orbit. The satellites in the satellite constellation system are powered by solar panels, and some of the energy generated by the solar panels is stored in batteries. As each satellite orbits around the earth in both a latitudinal and longitudinal direction, it experiences periods of time in which it is not exposed to the rays of the sun. During the "dark" periods, the satellite is required to draw energy from the batteries. Depending upon the orbit of the satellite and the demands of the coverage areas, the satellite can use between 200 watts and 1.2 kilowatts of power. Therefore, as satellites overlap coverage, the cells from satellites having the least available stored power would generally be shut off to preserve power for other non-overlapping cells. The energy may also be preserved for high use areas in the satellite's immediate future orbit. Referring again to FIG. 1, assuming satellites 16 and 17 had less energy stored in their batteries than satellite 12, those cells of satellites 16 covering overlap areas 18 and 20 would be shut down. Only the cells of satellite 20 would continue to operate in overlap areas 18 and 20. The commands requiring satellites 16 to shut down are either transmitted to satellites 16 as they pass over base control station 14, or through satellite 12 in cases of exigency. It should be noted that, depending on each satellite's orbit and demand areas, the cell from the satellite having the least energy stored may not necessarily be shut down. Such a determination is made by base control station 14, and either communicated directly to satellite 16, or relayed through the other satellites of the constellation.

Figure 4:
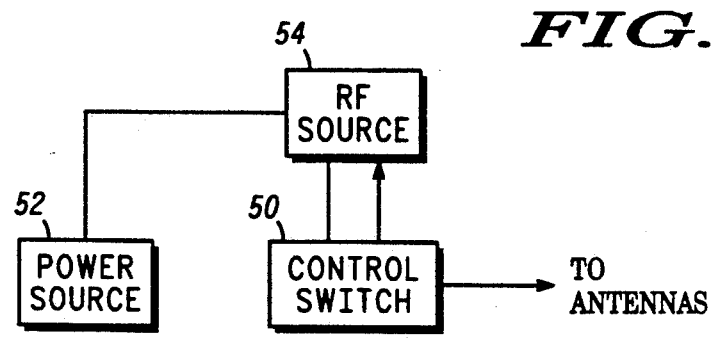
FIG. 4 is a block diagram of the power control system of the present invention.

FIG. 4 shows a simple block diagram of the power management system within each satellite.

Control switch 50 is connected between the antennas and power source 52 and RF source 54.

A power control signal from base control station 14 is received by Control switch 50. Control switch 50 controls the power from the batteries or solar panels, represented by power source 52, controls the corresponding RF signals from RF source 54 and to the affected antennas. For instance, if a particular antenna is relaying to an area overlapped by another satellite, base station 14 may instruct control switch 50 to cut power off to that particular antenna. No other antenna need be affected.

Figure 3:
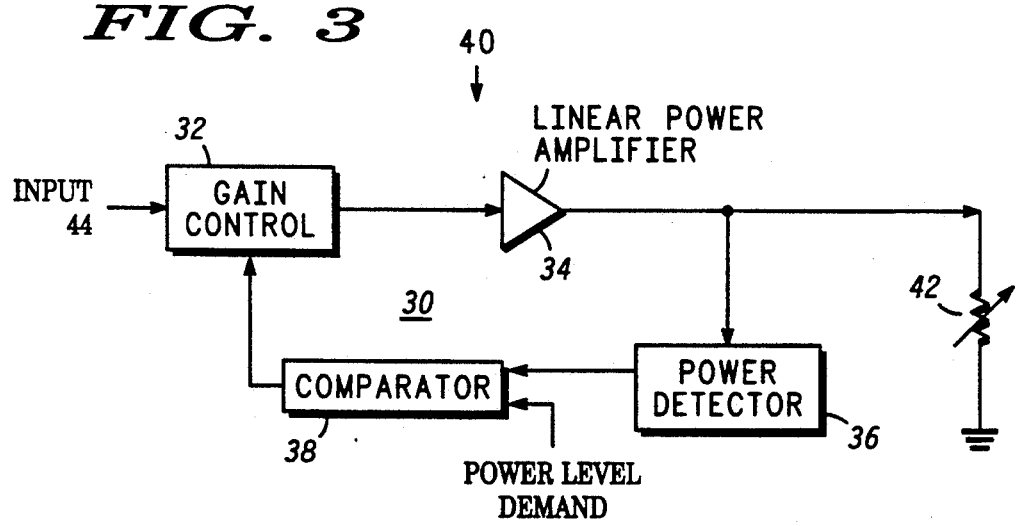
FIG. 3 is a schematic diagram of a voltage regulated amplifier circuit for a satellite power management system.

FIG. 3 shows an additional power control measure of the present invention. Specifically, each satellite in satellite constellation system 10 comprises a demand regulated feed-back circuit 30. By controlling the amount of power used by the satellite through feed-back circuit 30, each satellite can preserve power for periods of use during "dark" periods, or subsequent demand areas.

Feed-back circuit 30 comprises gain control 32, linear power amplifier 34, power detect 36, and comparator 38. Additionally, a power level demand signal 40 is received from a microprocessor on board the satellite. Feed-back circuit 30 is output to a variable load 42, and is also coupled to the batteries of the satellite (not shown) such that gain control 32 receives an input 44 from the batteries.

As the load of variable load 42 increases, a voltage at the output of linear power amplifier 34 decreases. This decrease is detected by power detect 36 which relays the voltage to comparator 38. Comparator 38 compares the voltage level from voltage detect with a minimum threshold received from power level demand 40. If the threshold has been surpassed, comparator 38 transmits a signal to gain control 32 to increase the current supplied to linear power amplifier 34. Similarly, if the load of variable load 42 decreases, the voltage at linear power amplifier 34 increases, which, when surpassing a maximum threshold, decreases the current supplied from gain control 32.

Thus there has been provided, in accordance with the present invention, a power management system for a worldwide multiple satellite satellite system that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A power management system for use in a worldwide low-earth orbit multiple satellite system wherein satellites comprising the satellite system form an overlapping orbiting constellation, each satellite adapted to project a plurality of antenna beams on the earth's surface, each beam having a first area of coverage of the earth's surface or "cell", the total sum of the cells for each satellite forming a second area of coverage of the earth's surface larger than said first area, the satellites each comprising a power source, a plurality of antennas and an RF source providing the antenna beams and said RF source coupled to the antennas, the power management system comprising:

means for determining the quantity of power relayed from the power source to each of the plurality of antennas, said power source coupled to said plurality of antennas;

said means for determining transmitting a signal indicating the quantity of power to be transmitted by each of the satellites to the RF source for the antennas, said means for determining being RF coupled to each said satellite;

a plurality of means for controlling the power from the RF source to each of the plurality of antennas of the satellite, said means for controlling coupled to said means for determining, to said power source and to said RF source; and each of said plurality of means for controlling the coupling of the power source of each of the satellites to the respective plurality of antennas and said means for controlling decoupling the power supplied to the antennas in order to turn off selected ones of the antenna beams which overlap with others of the antenna beams.

2. A power management system according to claim 1 wherein each of said plurality of means for controlling comprises a demand regulated linear power amplifier.

3. A power management system according to claim 1 wherein said means for determining comprises an earth-based control station.

4. A power management system according to claim 1 wherein said means for determining comprises a plurality of earth-based control stations distributed among multiple geographic locations.

5. A power management system according to claim 1 wherein said means for controlling comprises control switch means.

6. A power management system according to claim 1, wherein the means for controlling is further operated in response to said means for determining to turn on previously turned off antenna beams for a non-overlapping condition of the antenna beams.

7. A method for efficiently managing the power of a worldwide low substantially polar orbit satellite constellation system to avoid redundancy of coverage when more than one satellite within the system covers the same area, and to ensure sufficient stored energy within the satellite for all periods of the satellite's operation time, each satellite having a plurality of antennas, the plurality of antennas adapted to project a plurality of cells constituting a first area of coverage on the earth's surface the total sum of the cells for each satellite forming a second area of coverage of the earth's surface larger than said first area, the satellites each comprising a power source, a plurality of antennas, a control switch and an RF source providing antenna beams wherein the energy within the power source must be efficiently managed, the control switch coupled to the RF source, to the power source, and to the plurality of antennas, the method comprising the steps of:
programming the control switch of the satellite from a control station to supply power via the RF source to the antennas of the satellite at predetermined times to avoid overlap of coverage between cells of different satellites; and
controlling via the control switch the power from the RF source to each of the antennas with a voltage regulated power amplifier to turn off selected ones of the antenna beams overlapping with others of the antenna beams.

8. A method for efficiently managing the power of a worldwide low substantially polar orbit satellite constellation system according to claim 7 wherein said step of programming from a control station comprises programming the control switch of each of the satellites from an earth based control station.

9. The method according to claim 7, wherein there is further included the step of turning on the previously turned off antenna beams for a non-overlapping condition of the antenna beams.

10. A power management system for use in a worldwide multiple low-earth orbit satellite system wherein satellites comprising the satellite system form an overlapping orbiting constellation, each satellite having a plurality of antennas coupled to an RF source, said antennas projecting antenna beams, each beam having a first area of coverage or "cell", the total sum of the cells for each satellite forming a second area of coverage larger than the first area, the satellites each comprising solar cells and batteries wherein the power within the batteries is generated by the solar cells and stored in the batteries and the power must be efficiently managed, characterized in that the power management system includes an earth-based control station for programming each of the satellites to control the transfer of power from the batteries to the RF source at predetermined times, said earth-based control station communicating with each of the satellites, each said satellite including means for varying the power output from the battery of each of the satellites to the RF source depending upon a control signal transmitted by the earth-based control station for controlling an on/off status of each of the plurality of antennas, and one each of said means for varying coupled to said battery and to at least one each of said plurality of antennas.

11. The system of claim 10, characterized by a plurality of said earth-based control stations distributed among multiple geographic locations.

12. The system of claim 11, characterized in that each of said means for varying comprises a controllable linear power amplifier.

* * * * *